Dec. 23, 1958  A. DUERKSEN  2,865,049
RIM CENTERING DEVICE FOR TIRE RETREADING MOLDS
Filed Sept. 13, 1957
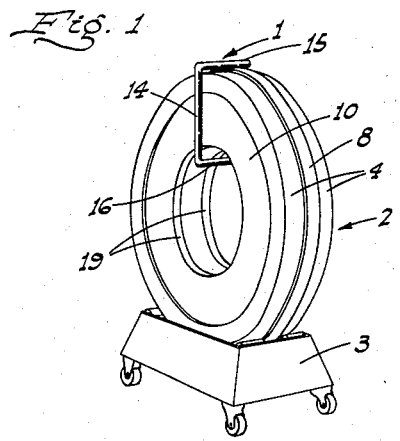
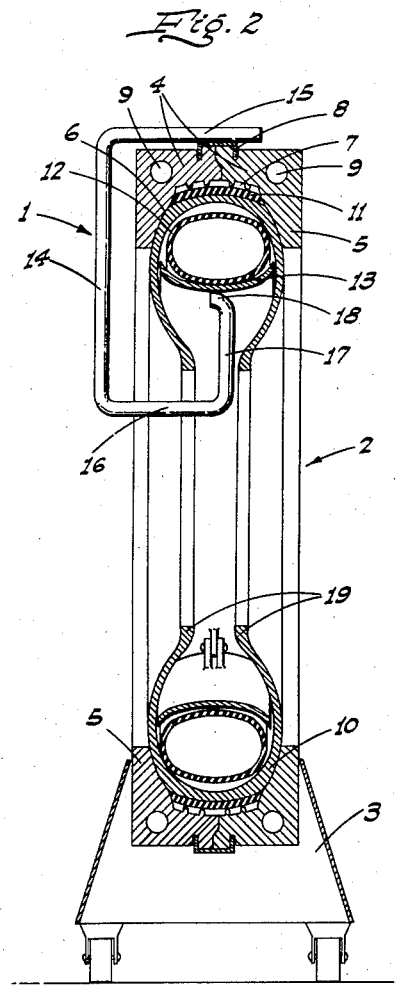
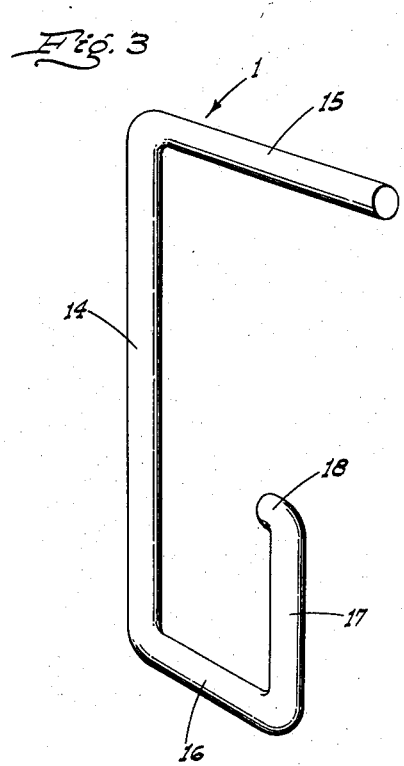
INVENTOR.
Arnold Duerksen
BY Webster & Webster
ATTYS.

United States Patent Office 2,865,049
Patented Dec. 23, 1958

2,865,049

RIM CENTERING DEVICE FOR TIRE RETREADING MOLDS

Arnold Duerksen, Lodi, Calif., assignor to Super Mold Corporation of California, a corporation of California Application September 13, 1957, Serial No. 683,811

1 Claim. (Cl. 18—18)

This invention relates to, and it is a major object to provide, an inside curing rim centering device, of novel construction and function, especially designed—but not limited—for use in cooperation with a vertically disposed, band-type, tire retreading mold having an annular, inwardly opening, tire receiving matrix cavity therein.

In such a mold the tire to be retreaded is first engaged in the matrix cavity, followed by insertion into the tire of an initially deflated curing bag or tube and then a relatively heavy metallic curing rim in backing relation to such tube. Because of the substantial weight of the curing rim it tends to sag off-center in the tire, imposing its weight on—and downwardly deforming—the lower portion of the curing tube before inflation of the latter. As a result, and upon subsequent inflation of the curing tube, it must not only lift the entire weight of the curing rim to centered position in the tire, but in so doing frequently the curing tube is pinched between the inside rim and tire, with resultant damage to such tube.

It is therefore another important object of the present invention to provide—for use in cooperation with a tire retreading mold of the type described—a novel device, in the form of a hanger, by means of which the curing rim is effectively suspended in centered position in the tire prior to—and during the period of—inflation of the curing tube. With the use of such device the curing tube is relieved of the weight of the curing rim, and such tube can be normally inflated in the cavity between the tire and rim without damage from pinching.

It is also an object of the invention to provide a device, for the purpose described, which is simple in structure, readily and economically manufactured, and very easy and convenient to use; yet providing the substantial advantages mentioned herein.

Still another object of the invention is to provide a practical, reliable, and durable rim centering device, and one which will be exceedingly effective for the purpose for which it is designed.

These objects are accomplished by means of such structure and relative arrangement of parts as will fully appear by a perusal of the following specification and claim.

In the drawings:

Fig. 1 is a perspective view of a vertically disposed, band-type retreading mold showing the rim centering device as in use thereon.

Fig. 2 is an enlarged transverse sectional elevation of the mold and the rim centering device as in Fig. 1; the view showing such device in elevation.

Fig. 3 is an enlarged perspective view of the rim centering device, detached.

Referring now more particularly to the drawings, and to the characters of reference marked thereon, the rim centering device is in the form of a hanger, indicated generally at 1; the device being adapted for use in an endless or band-type retreading mold 2 maintained in an upstanding or vertical position by a suitable support, such as a dolly 3.

The mold 2, in the type here illustrated, is comprised of mating annular mold halves 4 which include side skirts 5, and which mold halves define an endless, inwardly opening, tire receiving cavity 6 formed with the matrix design 7 in the bottom thereof. The annular mold halves 4 are retained in matching engagement by a central, circumferentially extending clamping ring 8; the mold 1 being heated by suitable means, such as steam passages 9 in said mold halves 4.

In use of the mold 1 a tire 10 is engaged at the crown portion in the cavity 6, with the new tread rubber or camelback 11 in engagement with the matrix design 7.

Before the actual vulcanizing operation is begun an initially deflated inside curing bag or tube 12 is inserted in the tire 10, and then a relatively heavy metallic inside curing rim 13 is likewise placed in said tire to provide effective backing for the curing tube 12 when it is inflated and the vulcanizing operation is undertaken.

However, when the curing rim 13 is first inserted in the tire 10, its weight tends to shift such rim downwardly in the tire to off-center position, and imposes a relatively substantial burden or load on the lower part of said curing tube 12, with the disadvantages heretofore explained.

Therefore, in order to support the curing rim 13 in a centered position in the tire 10 preparatory to inflating the curing tube 12, there is provided the device of the present invention, and which is constructed as follows:

The device, in generally the form of a block C-shaped hanger 1, is formed of a single length of relatively heavy-duty metallic rod, and comprises a vertical suspension shank 14; an upper, horizontal, laterally projecting supporting arm 15; a lower, horizontal, laterally projecting supporting arm 16; and a relatively short post 17 which upstands from the end of the arm 16 opposite the suspension shank 14 and parallel to the latter. The arms 15 and 16 likewise are in parallelism and at right angles to the suspension shank 14.

The upper arm 15 is of greater length than the lower arm 16 so that said arm 15 has a free end termination beyond the vertical plane of the post 17 and in a direction opposite the suspension shank 14. At its upper end the post 17 is deformed so as to define an inturned tip 18.

In use of the above described device, and after insertion of the curing tube 12 and curing rim 13 in the tire 10, but before inflation of such tube, the device is engaged with the mold 2 and curing rim 13 in the manner shown generally in Fig. 1, and particularly in Fig. 2.

The suspension shank 14 stands perpendicular adjacent but laterally out from one side of the mold 2, with the upper arm 15 projecting laterally across the mold and resting in engagement therewith, or flush on the clamping ring 8. The length of the upper arm 15 is such that it fully spans such clamping ring and extends beyond the center of the mold.

With the suspension shank 14 and upper arm 15 so disposed, the lower arm 16 extends inwardly and disposes the upstanding post 17 so that the latter projects into the tire 10 between the tire beads 19.

At the upper end of the post 17 the inturned tip 18 bears against the lower or under surface of the curing rim 13 at the top and centrally of its sides; the dimensioning of the parts of the device being such that said curing rim 13 is effectively supported centrally in the tire 10 preparatory to inflation of the curing tube 12.

The inturned tip 18 is provided in order that it may engage between circumferentially spaced lugs (not shown) which exist on certain curing rims, in depending relation, at the top thereof.

With the curing rim 13 effectively supported and centered in the tire 10 by the described device, the curing tube 12 may be inflated in a normal manner, and without pinching or damage.

After the curing tube 12 is inflated, the suspension shank 14 is grasped and pulled laterally outwardly, which causes the post 17 and tip 18 to shift off of the inverted crown of the curing rim 13, whereupon there is sufficient slack to permit the device to be easily and manually removed from the mold 2.

The term "retreading" as used herein is deemed to also include tread replacement on worn tires by "top capping" or "full capping."

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

The combination with a horizontal-axis full-circle tire retreading mold, having a tire engaged therein, an initially deflated curing tube in the tire, and an inside curing rim in the tire radially out from the beads of said tire and supporting the tube; of a rim centering hanger comprising a rigid shank extending radially of the tire and mold at the top and laterally out from the mold a sufficient distance for hand engagement, an upper arm rigid with the shank at the top overhanging and engaging the mold in the transverse central zone thereof, a lower arm on and rigid with the shank parallel to the upper arm radially inward of the tire and projecting laterally past one tire bead, and a post parallel to the shank rigid with and upstanding from the lower arm and engaging the curing rim at the top and centrally of its width and maintaining said rim centralized in the tire; the curing rim being exteriorly convex in cross section whereby when the shank is pulled laterally out from the mold the engagement of the post with the rim will be released to provide slack sufficient for the removal of the hanger from the mold.

References Cited in the file of this patent
UNITED STATES PATENTS

| | | |
|---|---|---|
| 1,207,117 | Wood | Dec. 5, 1916 |
| 1,620,435 | Burdette | Mar. 8, 1927 |